(12) United States Patent
Daccord et al.

(10) Patent No.: US 9,394,473 B2
(45) Date of Patent: Jul. 19, 2016

(54) METHODS AND COMPOSITIONS FOR SUSPENDING FLUIDS IN A WELLBORE

(75) Inventors: Gerard Daccord, Vauhallan (FR); Alice Chougnet-Sirapian, L'Hay les Ros (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1121 days.

(21) Appl. No.: 13/252,190

(22) Filed: Oct. 3, 2011

(65) Prior Publication Data

US 2012/0090842 A1 Apr. 19, 2012

(30) Foreign Application Priority Data

Oct. 13, 2010 (EP) .................................. 10290552

(51) Int. Cl.
| | |
|---|---|
| *C09K 8/40* | (2006.01) |
| *E21B 21/00* | (2006.01) |
| *E21B 33/134* | (2006.01) |
| *C09K 8/03* | (2006.01) |
| *C09K 8/42* | (2006.01) |

(52) U.S. Cl.
CPC ... *C09K 8/40* (2013.01); *C09K 8/03* (2013.01); *C09K 8/42* (2013.01); *E21B 21/003* (2013.01); *E21B 33/134* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 4,391,925 A | 7/1983 | Mintz et al. | |
| 4,439,328 A * | 3/1984 | Moity | 507/204 |
| 4,836,940 A | 6/1989 | Alexander | |
| 5,027,900 A * | 7/1991 | Wilson | 166/285 |
| 5,330,005 A | 7/1994 | Card et al. | |
| 5,339,902 A | 8/1994 | Harris et al. | |
| 5,377,760 A * | 1/1995 | Merrill | 166/295 |
| 5,439,055 A * | 8/1995 | Card et al. | 166/280.2 |
| 5,501,274 A | 3/1996 | Nguyen et al. | |
| 5,501,275 A | 3/1996 | Card et al. | |
| 5,582,249 A | 12/1996 | Caveny et al. | |
| 5,697,440 A | 12/1997 | Weaver et al. | |
| 5,782,300 A * | 7/1998 | James et al. | 166/278 |

(Continued)

FOREIGN PATENT DOCUMENTS

| | | |
|---|---|---|
| EP | 0721050 | 7/1996 |
| EP | 0735235 | 10/2000 |

(Continued)

OTHER PUBLICATIONS

Ahmed RM and Takach NE: "Fiber Sweeps for Hole Cleaning," Society of Petroleum Engineers Paper 113746, Dec. 2009.

(Continued)

*Primary Examiner* — Angela M DiTrani
*Assistant Examiner* — Anuradha Ahuja
(74) *Attorney, Agent, or Firm* — Jeremy D. Tillman; Michael Flynn; Tim Curington

(57) ABSTRACT

Methods for servicing subterranean wells are disclosed. Particularly, the use of a fiber-laden fluid to separate and prevent the commingling of two stationary process fluids after placement in the borehole of a subterranean well, or in a tubular body installed in a subterranean well. The fiber-laden fluids prevent the cement plug from descending through drilling fluid to the bottom of the well. It obviates the need for mechanical devices such as packers, or special adjustment of the process fluids' rheological properties.

18 Claims, 4 Drawing Sheets

(56) References Cited

U.S. PATENT DOCUMENTS

| | | | |
|---|---|---|---|
| 5,904,208 A * | 5/1999 | Ray et al. | 166/312 |
| 6,016,871 A | 1/2000 | Burts, Jr. | |
| 6,016,879 A | 1/2000 | Burts, Jr. | |
| 6,172,011 B1 | 1/2001 | Card et al. | |
| 6,218,343 B1 | 4/2001 | Burts, Jr. | |
| 6,221,152 B1 * | 4/2001 | Dial et al. | 106/805 |
| 6,283,213 B1 * | 9/2001 | Chan | 166/291 |
| 6,450,260 B1 | 9/2002 | James et al. | |
| 6,599,863 B1 | 7/2003 | Palmer et al. | |
| 6,716,798 B1 | 4/2004 | Burts, Jr. | |
| 6,732,800 B2 | 5/2004 | Acock et al. | |
| 6,837,309 B2 | 1/2005 | Boney et al. | |
| 6,867,170 B1 | 3/2005 | Burts, Jr. | |
| 6,927,194 B2 | 8/2005 | Burts, III | |
| 6,932,158 B2 | 8/2005 | Burts, III | |
| 6,938,693 B2 | 9/2005 | Boney et al. | |
| 6,939,833 B2 | 9/2005 | Burts, III | |
| 6,976,537 B1 | 12/2005 | Verret | |
| 7,143,827 B2 | 12/2006 | Chatterji et al. | |
| 7,275,596 B2 | 10/2007 | Willberg et al. | |
| 7,297,662 B2 | 11/2007 | Verret | |
| 7,306,041 B2 | 12/2007 | Milne et al. | |
| 7,350,572 B2 | 4/2008 | Fredd et al. | |
| 7,380,600 B2 | 6/2008 | Willberg et al. | |
| 7,380,601 B2 | 6/2008 | Willberg et al. | |
| 7,398,829 B2 | 7/2008 | Hutchins et al. | |
| 7,482,311 B2 | 1/2009 | Willberg et al. | |
| 2002/0040812 A1 | 4/2002 | Heying | |
| 2002/0157575 A1 * | 10/2002 | DiLullo et al. | 106/711 |
| 2004/0020651 A1 * | 2/2004 | Burts, III | 166/295 |
| 2004/0162356 A1 | 8/2004 | Willberg et al. | |
| 2004/0182577 A1 * | 9/2004 | Chatterji et al. | 166/305.1 |
| 2005/0175654 A1 | 8/2005 | Willberg et al. | |
| 2006/0000612 A1 * | 1/2006 | Reddy et al. | 166/293 |
| 2006/0042797 A1 * | 3/2006 | Fredd et al. | 166/282 |
| 2006/0096759 A1 * | 5/2006 | Reddy et al. | 166/295 |
| 2006/0157248 A1 * | 7/2006 | Hoefer et al. | 166/300 |
| 2006/0174802 A1 * | 8/2006 | Bedel et al. | 106/638 |
| 2006/0175060 A1 * | 8/2006 | Reddy | 166/294 |
| 2006/0254770 A1 * | 11/2006 | Hou | 166/291 |
| 2007/0056730 A1 * | 3/2007 | Keese et al. | 166/291 |
| 2007/0129262 A1 | 6/2007 | Gurmen et al. | |
| 2007/0281869 A1 | 12/2007 | Drochou et al. | |
| 2008/0023205 A1 * | 1/2008 | Craster et al. | 166/387 |
| 2008/0060811 A1 * | 3/2008 | Bour et al. | 166/291 |
| 2008/0093073 A1 | 4/2008 | Bustos et al. | |
| 2008/0110627 A1 * | 5/2008 | Keese et al. | 166/292 |
| 2008/0135242 A1 | 6/2008 | Lesko et al. | |
| 2008/0234147 A1 | 9/2008 | Li et al. | |
| 2008/0236832 A1 | 10/2008 | Fu et al. | |
| 2008/0245527 A1 * | 10/2008 | Leugemors et al. | 166/280.1 |
| 2009/0032252 A1 | 2/2009 | Boney et al. | |
| 2009/0054269 A1 * | 2/2009 | Chatterji et al. | 507/104 |
| 2009/0095475 A1 * | 4/2009 | Ravi et al. | 166/293 |
| 2010/0288495 A1 * | 11/2010 | Willberg et al. | 166/278 |
| 2010/0307747 A1 * | 12/2010 | Shindgikar et al. | 166/276 |
| 2012/0322695 A1 * | 12/2012 | Kefi et al. | 507/118 |

FOREIGN PATENT DOCUMENTS

| | | |
|---|---|---|
| EP | 0619415 | 1/2002 |
| EP | 0783073 | 11/2002 |
| EP | 0834644 | 12/2004 |
| EP | 1165936 | 3/2006 |
| EP | 1789650 | 11/2008 |
| EP | 2085447 | 8/2009 |
| EP | 2305767 | 4/2011 |
| WO | 2005/059058 | 6/2005 |
| WO | 2006/003637 | 1/2006 |
| WO | 2009/079231 | 6/2009 |
| WO | 2009/079234 | 6/2009 |
| WO | 2009/083236 | 7/2009 |
| WO | 2009/083238 | 7/2009 |
| WO | 2009/088317 | 7/2009 |

OTHER PUBLICATIONS

Alava M and Niskanen K: "The Physics of Paper," Rep. Prog. Phys. (2006) 69, 669-723.

Daccord G, Craster B, Ladva H and Jones TGJ: "Cement-Formation Interactions," in Nelson EB and Guillot D (eds.): Well Cementing 2nd Edition, Schlumberger, Houston (2006) 191-232.

Daccord G, Guillot D and James S: "Remedial Cementing," in Nelson EB and Guillot D (eds.): Well Cementing 2nd Edition, Schlumberger, Houston (2006) 503-547.

Hubbe MA: "Flocculation and Redispersion of Cellulosic Fiber Suspensions: a Review of Effects of Hydrodynamic Shear and Polyelectrolytes," Review Articles, BioResources (2007) 2(2), 296-331.

Joung CG, Phan-Thien N and Fan XJ: "Viscosity of Curved Fibers in Suspension," J. Non-Newtonian Fluid Mechanics (2002) 102, 1-17.

Nigam M: "Challenges in Pulp Processing," 12th ERCOFTAC NPC Meeting, May 29-30, 2008, 1-19. Retrieved from the Internet: URL: http://www.mech.kth.se/ercoftac/events/NPC12/presentations/Thursday/Nigam.pdf [retrieved on Sep. 5, 2010].

Parker PN et al.: "An Evaluation of a Primary Cementing Technique Using Low Displacement Rates," paper SPE 1234 presented at the SPE Annual Meeting, Denver, Colorado, USA (Oct. 3-6, 1965).

Piot B and Cuvillier G: "Primary Cementing Techniques," in Nelson EB and Guillot D (eds.): Well Cementing—2nd Edition, Houston: Schlumberger (2006): 459-501.

Roussel N and Coussot P: "Fifty-Cent Rheometer for Yield-Stress Measurements: From Slump to Spreading Flow," J. Rheology (May/Jun. 2005) 49(3), 705-718.

Switzer CF and Klingenberg DJ: "Rheology of Sheared Flexible Fiber Suspensions via Fiber-Level Simulations," J. Rheology, 47 (3) 759-778.

Wamba Fosso S, Tina M, Frigaard IA and Crawshaw JP: "Viscous-Pill Design Methodology Leads to Increased Cement Plug Success Rates; Application and Case Studies from Southern Algeria," paper SPE 62752, presented at the IADC/SPE Asia Pacific Drilling Technology Conference, Kuala Lumpur, Malaysia (Oct. 11-13, 2000).

Xu H and Aidun CK: "Characteristics of Fiber Suspension Flow in a Rectangular Channel," International Journal of Multiphase Flow, 31 (Mar. 2005) 318-336.

ASTM International: "Standard Test Method for Slump of Hydraulic-Cement Concrete," Publication ASTM C143/C143M-12, Jan. 2013.

Crawshaw JP and Frigaard IP: "Cement Plugs: Stability and Failure by Buoyancy-Driven Mechanism," paper SPE 56959, presented at the Offshore Europe Oil and Gas Exhibition and Conference, Aberdeen, UK (Sep. 7-10, 1999).

Daccord G, Guillot D and Nilsson F: "Mud Removal," in Nelson EB and Guillot D (eds.): Well Cementing—2nd Edition, Houston: Schlumberger (2006): 143-189.

* cited by examiner

METHODS AND COMPOSITIONS FOR SUSPENDING FLUIDS IN A WELLBORE

CROSS-REFERENCED APPLICATIONS

This application claims the benefit of the disclosure of European Patent Application No. EP10290552.8 filed on Oct. 13, 2010 incorporated by reference in its entirety.

BACKGROUND

The statements in this section merely provide background information related to the present disclosure and may not constitute prior art.

The present disclosure is related in general to fluid compositions and methods for servicing subterranean wells. Particularly, the disclosure relates to the use of fluids containing fibers to support another wellbore-servicing fluid above, and to prevent their commingling. Such fluids containing fibers are also referred to as "fiber-laden fluids."

Well-servicing operations frequently involve the pumping and placement of process fluids in the wellbore. Such process fluids may include (but not be limited to) drilling fluids, spacer fluids, chemical washes, cement slurries, acidizing fluids, fracturing fluids, formation-consolidation fluids and gravel-pack fluids.

In many cases, different process fluids are pumped through tubulars in a sequence. Perhaps the most common example is primary well cementing, during which the fluid sequence may involve drilling fluid, followed by a spacer fluid, and then followed by one or more cement-slurry formulations.

Similar situations may occur during remedial cementing. Remedial cementing is a general term to describe operations that employ cementitious fluids to cure a variety of well problems. Such problems may occur at any time during the life of a well, from well construction to well stimulation, production and/or abandonment. Plug cementing is a subset of remedial cementing, during which a discrete volume of cement slurry is placed in a wellbore and allowed to set. There may or may not be casing present in the well. Plug cementing is most commonly performed during the following scenarios: sealing lost-circulation zones, sidetracking around a fish (lost object or other debris in the hole), initiating directional drilling, sealing a depleted zone, protecting a low-pressure zone during a workover treatment and sealing wells for abandonment.

In most cases, cement plugs are placed at a distance above the bottom of the well, which may be filled with drilling fluid or completion fluid. In many cases, the density of the cement slurry will be higher than that of the drilling or completion fluid. If no precautions are taken, the slurry will likely fall to the bottom of the hole.

Several techniques have been disclosed in the art to prevent or minimize downward movement of the cement plug after placement. The methods fall into two principal categories: hydrodynamic or mechanical.

Hydrodynamic techniques may involve adjusting the rheological properties of the cement plug. For example, thixotropic cements are frequently used. In practical terms, thixotropic slurries are fluid during mixing and displacement but rapidly form a rigid, self-supporting gel structure when pumping ceases. Thus, after placement, the slurry gel structure helps prevent commingling with the fluid below.

Another hydrodynamic technique is to place a viscous pill between the cement plug and the drilling or completion fluid, thereby providing support for the cement slurry. For example, a viscous pill may comprise a crosslinked-polymer fluid which may also contain lost-circulation materials (LCMs). The pills are usually rubbery, ductile or spongy, and have little compressive strength after setting. Other examples include gelled sodium-silicate solutions and gelled hydrocarbons. The crosslinking or thickening may be activated by time, temperature or shearing through a drill bit. In most cases, the fluid composition and rheological properties must be custom designed for a particular application. A detailed description of these fluids is presented in the following publication: Daccord G, Craster B, Ladva H and Jones T G J: "Cement-Formation Interactions," in Nelson E B and Guillot D (eds.): *Well Cementing* $2^{nd}$ *Edition*, Schlumberger, Houston (2006) 191-232.

Mechanical methods to support a cement plug include devices such as inflatable packers. When the tool reaches the target location, the inflatable packer expands to provide a mechanical support. An umbrella-shaped tool may be deployed below the cement plug to help support said cement plug. Also, a diaphragm bow, pumped like a cement plug through drillpipe, expands when it exits and acts as a hydraulic barrier. These devices effectively provide support for a cement plug; however, special hardware at the wellhead is required to deploy them. In addition, working with these devices is time consuming. A description of these devices is presented in the following publication: Daccord G, Guillot D and James S: "Remedial Cementing," in Nelson E B and Guillot D (eds.): *Well Cementing* $2^{nd}$ *Edition*, Schlumberger, Houston (2006) 503-547.

Despite the valuable contributions from the art, it remains desirable to provide means to support a cement plug without the need to tailor a fluid composition or rheological properties, and without the need to provide special hardware at the wellsite.

SUMMARY

In an aspect, embodiments relate to methods for preventing the commingling of stationary process fluids in a subterranean borehole or in a tubular body installed in a subterranean well.

In a further aspect, embodiments relate to methods for setting a cement plug in a subterranean well.

In yet a further aspect, embodiments relate to the treatment of a well.

DETAILED DESCRIPTION

Figure 1:
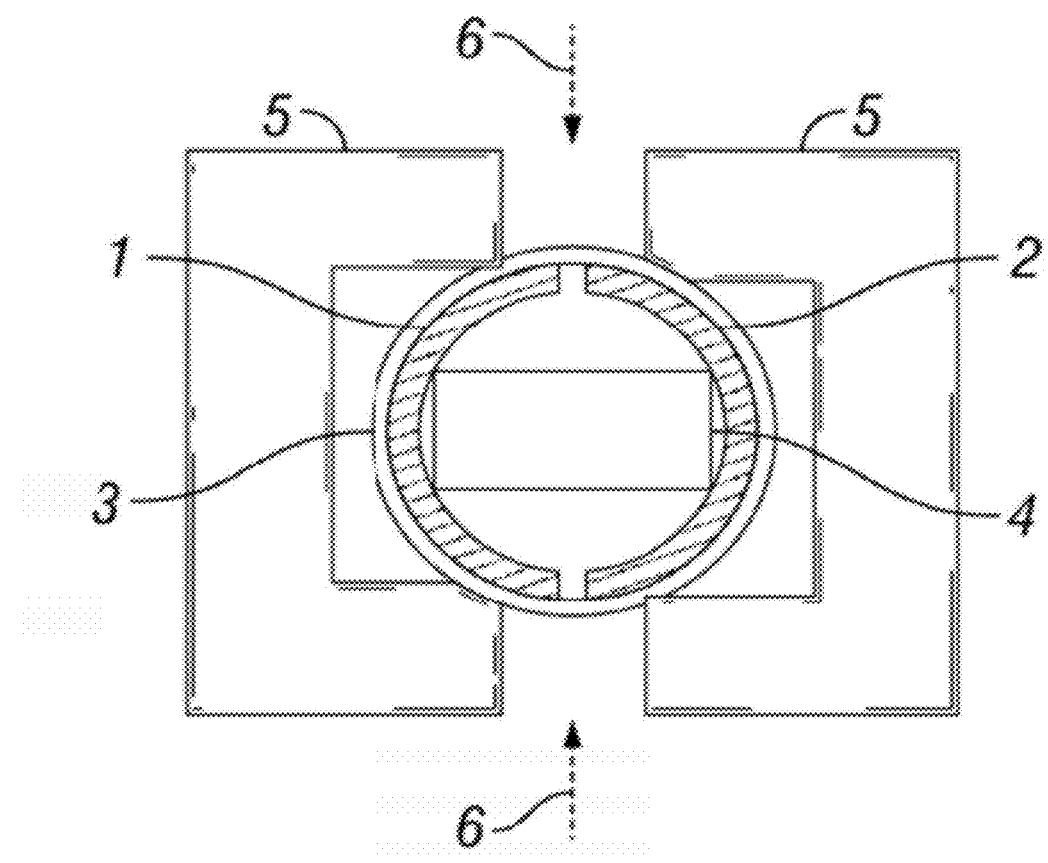
FIG. 1 is a cross-sectional diagram of the apparatus constructed by the inventors to prepare curved fibers described in the examples.

The disclosure primarily relates to the treatment of vertical wells, but is equally applicable to wells of any orientation. It is primarily disclosed for hydrocarbon production wells, but it is to be understood that the methods may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

In the following text, the term "fiber laden" is to be understood, in the context of the present disclosure, as "containing fibers."

In an aspect, embodiments relate to methods for preventing the commingling of process fluids in a subterranean borehole or in a tubular body installed in a subterranean well, preferably preventing the commingling of stationary process fluids. In the present context, "commingling" means the mixing of process fluids in the wellbore, a process fluid descending into another process fluid, or both. The methods comprise the use of a fiber-laden liquid suspension to separate two process fluids. The fibers are present at a concentration sufficient to impart high yield stress to the suspension. The yield stress arises from fiber entanglement. To achieve sufficient fiber entanglement to develop yield stress, the fiber concentration in the suspension, the fiber length and the fiber diameter are chosen such that the "crowding factor" exceeds about 50.

The crowding factor is given by Eq. 1.

$$N_{cr} = \frac{2}{3} C_v \left(\frac{L}{d}\right)^2, \quad \text{(Eq. 1)}$$

where $N_{cr}$ is the crowding factor, $C_v$ is the fiber-volume concentration, L is the length of the fibers and d is the diameter of the fibers (for doing the calculation, L and d shall be expressed in the same unit). The crowding factor is independent of fiber shape. The fibers may be chosen from a variety commonly used in the oilfield. These fibers include (but are not limited to) natural and synthetic organic fibers, glass fibers, ceramic fibers, carbon fibers, inorganic fibers, metallic fibers and mixtures thereof. The fibers may be linear (i.e., extending in a straight line), curved or both. However, curved fibers tend to interact more strongly with one another, improving the cohesion of the network.

The fiber length (linear or curved) may be between about 6 mm and 50 mm, between 6 mm and 25 mm and between 10 mm and 20 mm. Fiber diameters between about 25 micrometers and about 300 micrometers may be employed; however, diameters between 100 and 300 micrometers and diameters between 200 and 280 micrometers may also be employed. The fiber concentration is generally greater than about 20 g/L. Generally, the fiber concentration may be from 18 g/L to 40 g/L, 19 g/L to 35 g/L, or even 20 g/L to 30 g/L.

The method comprises selecting a fiber-laden support fluid, wherein the fiber concentration, length and diameter are chosen such that the crowding factor exceeds about 50. A first process fluid is placed into the wellbore or tubular body. A volume of the fiber-laden support fluid is then placed such that it rests on top of the first process fluid. Then a second process fluid is placed such that it rests on top of the support fluid. Each fluid is intended to be stationary after placement.

The methods are designed, for example, to address situations in which the second-process-fluid density is higher than that of the first process fluid. In addition, the yield stress of the support fluid is preferably higher than that of the first process fluid, and may also be higher than that of the second process fluid.

The non-fibrous portion of the support fluid may be (but is not limited to) a bentonite suspension, water-soluble-polymer solution (linear or crosslinked), oil-base fluid, water-in-oil emulsion, oil-in-water emulsion or water-in-water emulsion.

In a further aspect, embodiments relate to methods for setting a cement plug in a subterranean well. The methods involve selecting a fiber-laden support fluid, wherein the fiber concentration, length and diameter are chosen such that the crowding factor exceeds about 50. A process fluid is placed in the wellbore or a tubular body installed in the wellbore. A volume of support fluid is placed on top of the process fluid. A cement-plug fluid is then placed on top of the support fluid. Each fluid is preferably intended to be stationary after placement.

The cement-plug fluid may comprise (but would not be limited to) one or more members of the list comprising Portland cement, high alumina cement, fly ash, blast-furnace slag, lime-silica blends, chemically bonded phosphate ceramics and geopolymers.

The fibers may be chosen from a variety commonly used in the oilfield. These fibers include (but are not limited to) natural and synthetic organic fibers, glass fibers, ceramic fibers, carbon fibers, inorganic fibers, metallic fibers and mixtures thereof. The fibers may be linear (i.e., extending in a straight line), curved or both.

The fiber length (linear or curved) may be between about 6 mm and 50 mm, between 6 mm and 25 mm and between 10 mm and 20 mm. Fiber diameters between about 25 micrometers and about 300 micrometers may be employed; however, diameters between 100 and 300 micrometers and diameters between 200 and 280 micrometers may also be used. The fiber concentration is usually greater than about 20 g/L.

This embodiment is mainly designed to address situations in which the cement-plug fluid is higher than that of the first process fluid. In addition, the yield stress of the support fluid is preferably higher than that of the first process fluid, and may also be higher than that of the cement-plug fluid.

EXAMPLES

The present disclosure may be further illustrated with the following examples.

The fiber used in Examples 1 and 2 was a polyamide fiber (Tynex® 612, available from DuPont). Its density is 1.067 g/cm$^3$, the fiber diameter varies from 280-310 micrometers, the melting temperature is about 210° C. and the Young's modulus is about 3 GPa.

Both linear and curved fibers were tested. The length of the linear fibers was 20.8 mm±1.6 mm. Curved fibers are characterized by their Feret length and their curvature. The Feret length is the straight-line distance between each end of the fiber. The curvature is the angle between straight lines drawn from the center of the fiber curve and the ends of each segment. In the following examples, the Feret length was 20.2 mm±1.6 mm and the curvature was 80°, corresponding to a circle diameter of about 31 mm.

The curved fibers were prepared with a device constructed by the inventor, depicted in FIG. 1. The procedure is given below.
1. Choose a continuous fiber filament.
2. Wrap the filament 3 around the two half cylinders 1 and 2. Adjust the spacing rod 4 to achieve the desired cylinder diameter. In these examples, the cylinder diameter was 12 mm
3. Place the cylinder and coiled fiber in an armature comprising two brackets 5 to hold the fiber in place.
3. Heat the cylinder and filament to a temperature within the workability range of the fiber composition. The workability range is generally between the softening temperature and the melting temperature of the fiber. If the fiber composition does not melt, the workability range is between the softening temperature and the decomposition temperature. In the examples, the Tynex® 612 fibers were heated to 150° C.
4. Quench the system to room temperature.
5. Hold the coiled fiber and make two cuts 180° apart 6 along the length of the cylinder.
6. Free the cut fibers. Their length is half the cylinder perimeter, and their shape is close to being semi-circular.

The yield stress of fiber-laden suspensions was measured with an Abrams cone, described in ASTM Standard C143. This device is commonly used to measure the yield stress of concretes. The cone is filled with the sample fluid. The cone is then lifted and the fluid spreads out. Analysis of the size and shape of the spread fluid reveals rheological information. The yield stress of a sample fluid is given by Eq. 2.

$$\tau_y = \frac{255}{128} \frac{\rho g \Omega^2}{\pi^2 R^5}, \quad \text{(Eq. 2)}$$

where $\rho$ is the bulk fluid density, g is the acceleration of gravity, R is the radius of the spread fluid and $\Omega$ is the cone volume equal to $$\Omega = \frac{\pi H}{12}(r_1^2 + r_2^2 + r_1 r_2). \quad \text{(Eq. 3)}$$

H is the cone height, and $r_1$ and $r_2$ are the radii of the top and bottom sections. For the following examples, the cone dimensions and volume were: H=15 cm; $r_1$=2.5 cm; $r_2$=5 cm; $\Omega$=689 cm$^3$.

The procedure used to monitor the yield stress is given below.
1. A volume of fiber suspension slightly larger than the cone volume is prepared, so that most of the mixed material will be poured into the cone.
2. The fiber suspension is manually mixed in a beaker until it appears to be homogeneous.
3. The cone is placed at the middle of a clean and uniform plane plate. Preferably, scale bars are drawn directly on the plate.
4. The fiber suspension is poured into the cone up to the top end. Care must be taken to obtain repeatable top levels. While pouring the fluid, the cone must be firmly held down against the plate to minimize leakage out of the bottom.
5. The assembly is left static for 10 minutes. This duration corresponds to the common "10-min gel strength" measurement employed by oilfield personnel.
6. The cone is slowly raised to minimize inertial effects.
7. Photographs of the spread suspension are taken, on which the scale bars must be visible, allowing measurement of the spread radius by image analysis.

The image analysis software was ImageJ, developed by the US National Health Institute. Additional information concerning ImageJ may be obtained in the following reference: Burger W and Burge M J: *Digital Image Processing—An Algorithmic Introduction using JAVA*, Springer, ISBN: 978-1-84628-379-6 (2008).

Example 1

Figure 2:
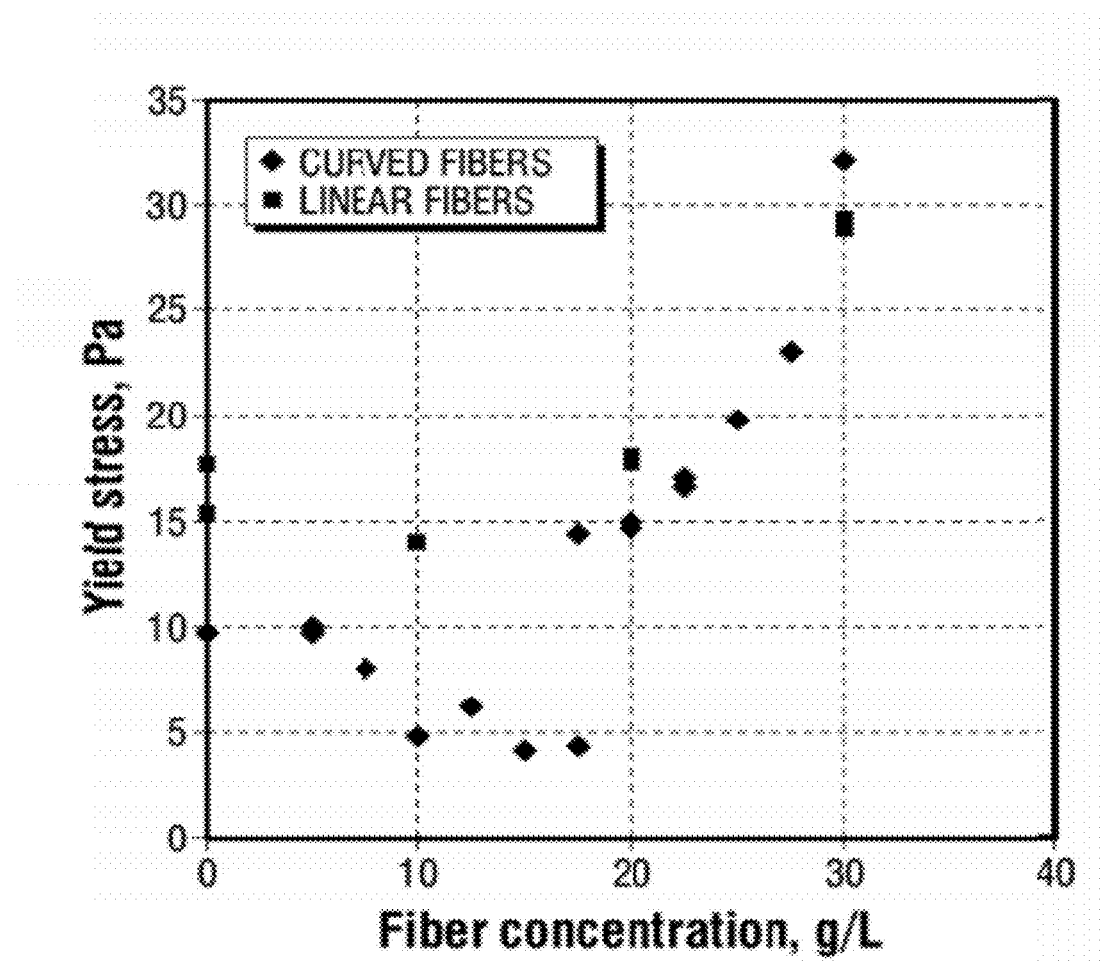
FIG. 2 is a plot showing the effect of adding linear or curved fibers on the yield stress of a 90-g/L bentonite suspension.

A 90-g/L suspension of bentonite in water was prepared as the plug base fluid. Fluids containing various amounts of either linear or curved fibers (up to 30 g/L) were placed in the Abrams cone, the spread radius was measured and the yield stress was calculated. The results are shown in FIG. 2. A yield-stress increase was observed at fiber concentrations above about 20 g/L. This concentration corresponds to a crowding number close to 50.

Example 2

Figure 3:
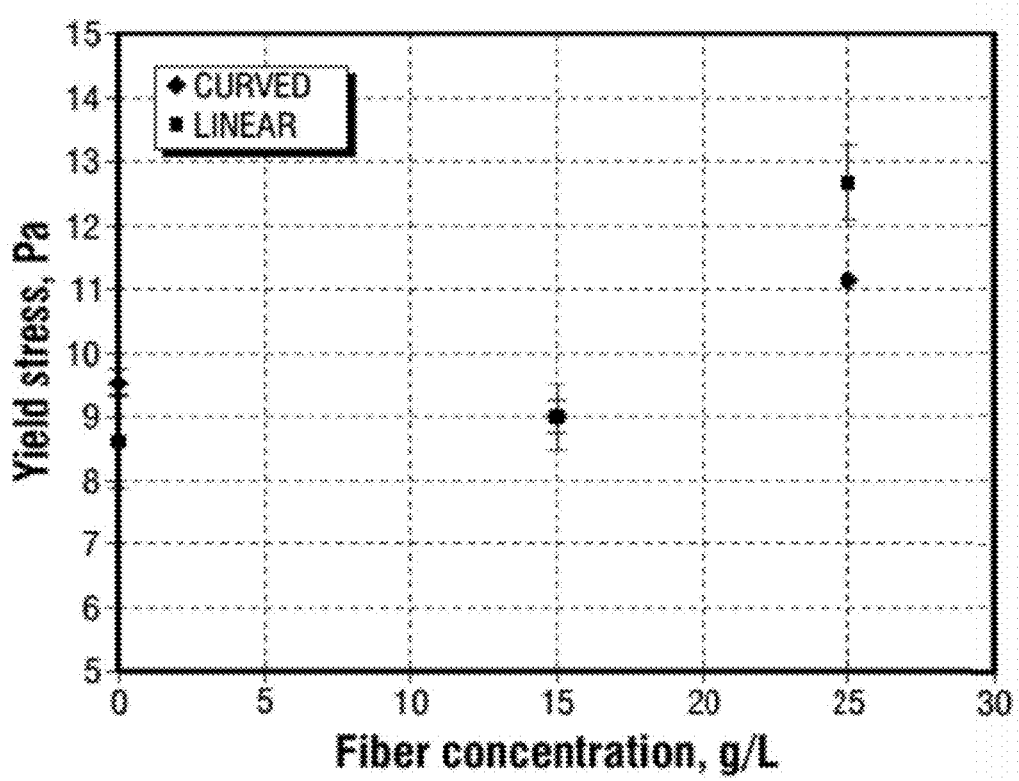
FIG. 3 is a plot showing the effect of adding linear or curved fibers on the yield stress of a 100-g/L bentonite suspension.

A 100-g/L suspension of bentonite in water was prepared as the plug base fluid. Fluids containing various amounts of either linear or curved fibers (up to 30 g/L) were placed in the Abrams cone, the spread radius was measured and the yield stress was calculated. The results are shown in FIG. 3. A yield-stress increase was again observed at fiber concentrations above about 20 g/L.

Example 3

Figure 4:
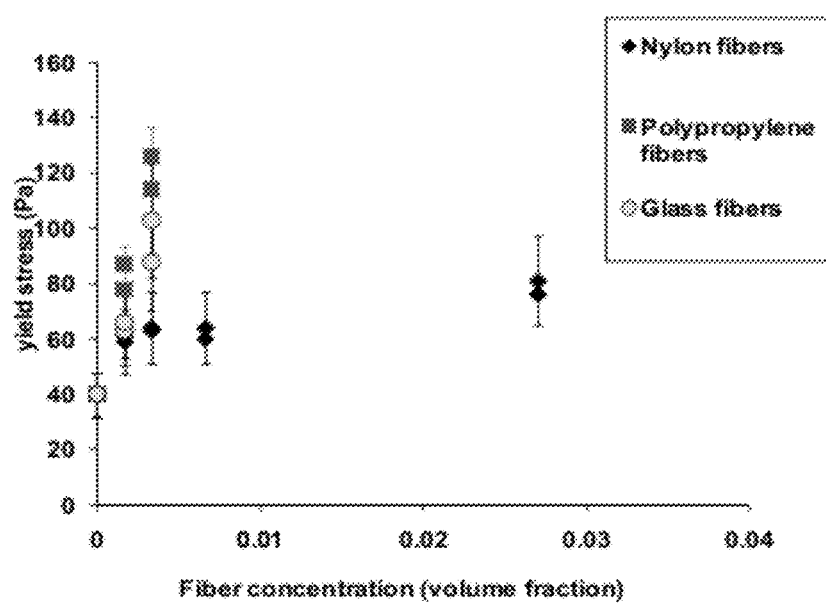
FIG. 4 is a plot showing the effect of adding various types of linear fibers on the yield stress of a 120-g/L bentonite suspension.

A 120-g/L suspension of bentonite in water was prepared as the plug base fluid. Fluids containing various concentrations of linear fibers were placed in the Abrams cone, the spread radius was measured and the yield stress was calculated. Glass, polypropylene and nylon fibers were tested, and their compositions are given in Table 1. The results are shown in FIG. 4. Fiber concentrations are expressed in terms of volume fraction in the fluid. In each case, a yield-stress increase occurred above a critical concentration, corresponding to a crowding factor exceeding 50.

TABLE 1

Fiber characteristics.

| Fiber type | Length (mm) | Diameter (μm) | Density (kg/m$^3$) |
|---|---|---|---|
| Glass | 11 | 20 | 2550 |
| Polypropylene | 19 | 10 | 900 |
| Nylon | 16 | 279 | 1080 |

The invention claimed is:
1. A method for preventing commingling of stationary process fluids in a subterranean borehole or in a tubular body installed in a subterranean well, comprising:
   i. selecting a fiber-laden support fluid having a supporting yield stress resulting from an entanglement of fibers contained therein that are present at a chosen, concentration, length and diameter such that a crowding factor is achieved that exceeds 50;
   ii. placing a first process fluid having a first yield stress into a wellbore or tubular body;
   iii. placing a volume of the support fluid on top of the first process fluid;
   iv. placing a second process fluid having a second yield stress on top of the support fluid;

v. allowing the first process fluid, the second process fluid and the support fluid to remain stationary after placement; and vi. allowing fiber entanglement to occur in the stationary support fluid, thereby causing the support fluid to develop the supporting yield stress that prevents commingling of the first and second process fluids, wherein the supporting yield stress is higher than the first yield stress.

2. The method of claim 1, wherein the process fluids are selected from the list comprising drilling fluids, spacer fluids, cement slurries, formation-consolidation fluids and gravel-pack fluids.

3. The method of claim 1, wherein the second process fluid has a density that is higher than that of the first process fluid.

4. The method of claim 1, wherein the supporting yield stress is higher than the second yield stress.

5. The method of claim 1, wherein the support fluid comprises one or more members of the list consisting of natural and synthetic organic fibers, glass fibers, ceramic fibers, carbon fibers, inorganic fibers and metallic fibers.

6. The method of claim 1, wherein the support fluid comprises linear fibers, curved fibers or both.

7. The method of claim 1, wherein the fiber length is between 6 mm and 50 mm.

8. The method of claim 1, wherein the fiber diameter is between 25 micrometers and 300 micrometers.

9. The method of claim 1, wherein the fiber concentration is higher than 20 g/L.

10. The method of claim 1, wherein the support fluid comprises one or more members of the list consisting of a bentonite suspension, a linear water-soluble-polymer solution, a crosslinked water-soluble polymer solution, oil-base fluid, water-in-oil emulsion, oil-in-water emulsion and a water-in-water emulsion.

11. A method for setting a cement plug in a subterranean well, comprising:

i. selecting a fiber-laden support fluid having a supporting yield stress resulting from an entanglement of fibers contained therein that are present at a chosen concentration, length and diameter such that a crowding factor is achieved that exceeds 50;

ii. placing a first process fluid having a first yield stress into a wellbore or tubular body installed in the wellbore;

iii. placing a volume of the support fluid on top of the first process fluid in the wellbore or tubular body;

iv. placing a cement-plug fluid having a second yield stress on top of the support fluid;

v. allowing the cement-plug fluid to remain stationary in the well; and vi. allowing fiber entanglement to occur in the support fluid, thereby causing the support fluid to develop the supporting yield stress that prevents commingling of the first process fluid and the cement-plug fluid, wherein the supporting yield stress is higher than the first yield stress.

12. The method of claim 11, wherein the cement-plug fluid has a density that is higher than that of the process fluid.

13. The method of claim 11, wherein the supporting yield stress is higher than the second yield stress.

14. A method for treating a subterranean borehole or a tubular body installed in a subterranean well, comprising:

i. selecting a fiber-laden support fluid having a supporting yield stress resulting from an entanglement of fibers contained therein that are present at a chosen concentration, length and diameter such that a crowding factor is achieved that exceeds 50;

ii. placing a first process fluid having a first yield stress into the borehole or tubular body;

iii. placing a volume of the support fluid on top of the first process fluid in the borehole or tubular body;

iv. placing a second process fluid having a second yield stress on top of the support fluid;

v. allowing the second process fluid to remain stationary in the well; and vi. allowing fiber entanglement to occur in the support fluid, thereby causing the support fluid to develop the supporting yield stress that prevents commingling of the first and second process fluids, wherein the supporting yield stress is higher than the first yield stress.

15. The method of claim 14, wherein the process fluids are selected from the list consisting of drilling fluids, spacer fluids, cement slurries, formation-consolidation fluids and gravel-pack fluids.

16. The method of claim 14, wherein the fiber length is between 6 mm and 50 mm.

17. The method of claim 14, wherein the fiber diameter is between 25 micrometers and 300 micrometers.

18. The method of claim 14, wherein the fiber concentration is higher than 20 g/L.

* * * * *